May 8, 1962 W. T. BEATTY 3,032,909

WEEDLESS FISH HOOK

Filed Jan. 17, 1962

INVENTOR.
William T. Beatty
BY
Bacon & Thomas
ATTORNEYS

United States Patent Office 3,032,909
Patented May 8, 1962

3,032,909
WEEDLESS FISH HOOK
William T. Beatty, 167 Market St.,
P.O. Box 389, Potsdam, N.Y.
Filed Jan. 17, 1962, Ser. No. 166,779
8 Claims. (Cl. 43—36)

The present invention relates to fish hooks, and more particularly to improvements in the construction of weedless fish hooks adapted to be actuated by the bite of a fish thereon.

Fish hooks, which are constructed in accordance with prior art disclosures, often become snagged when used for fishing in locations where logs and rocks are present or become loaded with weeds, grass or other vegetation when employed in areas where such growth prevails. In some instances, guards have been provided on fish hooks in order to protect the point and the barb of the fish hook and to prevent the snagging or loading of the fish hook. Such guards, however, do not permit the fish to have easy access to the fish hook in order to become hooked thereby and often permit the fish to slip off the fish hook after a bite or strike.

The fish hook of the present invention overcomes the deficiencies inherent in prior art fish hooks, and one of the main objects of the invention is to provide a fish hook which may be drawn over logs and rocks and through weeds without becoming snagged or loaded with weeds.

Another object of the invention is to provide a fish hook which is adapted to have the points and barbs thereof nested and sheltered by the shanks of the fish hooks when in inoperative position.

Another object is to provide a fish hook in which the shank of one fish hook forms a guard for the point and barb of the adjacent cooperating fish hook.

Another object is to provide a fish hook which is actuated by the bite of the fish thereon from any direction to move the barbed end of the fish hooks into exposed position.

Another object is to provide a fish hook which may be actuated from nested to exposed position by a fish biting or striking the fish hook from the rear end, side or front end thereof.

Another object is to provide a weedless fish hook which is of rugged, sturdy construction, reliable in operation and economical to manufacture.

Other objects and advantages of the invention will become more apparent from the following specification when taken in conjunction with the drawings in which.

Figure 1:
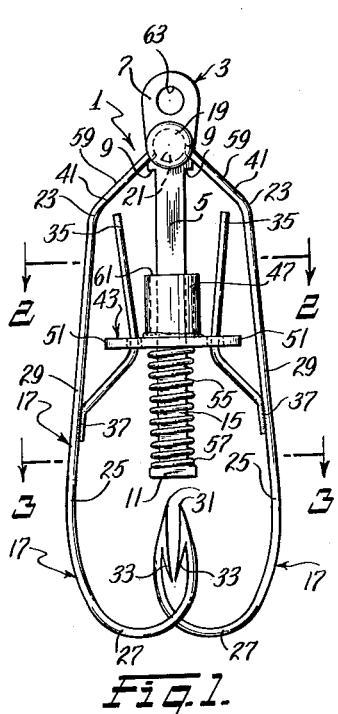
FIG. 1 is a side elevational view of the fish hook with the barbs and points of the fish hooks in protected, nested position.

The weedless fish hook of the present invention, which is generally indicated by the numeral 1, includes an elongated stem 3, which may be formed from aluminum, bronze or other suitable material that will not become rusted or corroded when exposed to moisture. Stem 3 includes a body portion 5, illustrated as being formed of square material but which may be formed of material of any other non-circular configuration, as viewed in cross section.

Immediately above body portion 5, the stem 3 may be formed with an enlarged head portion 7, which is wider than but of substantially the same thickness as body portion 5. Laterally extending shoulders 9 are formed on opposite edges of stem 3 at the point where head portion 7 extends inwardly to join the upper end of body portion 5.

Approximately midway between shoulders 9 and the lower end 11 of stem 3, the stem is formed with a circular portion 13, the diameter of which is substantially the same as the width or thickness of body portion 5. In the event that stem 3 is formed in some other non-circular, cross sectional configuration, the diameter of circular portion 13 will be formed to be substantially the same as the shortest dimension across the center of the stem.

The lower portion of the stem between circular portion 13 and the lower end 11 thereof is desirably of the same configuration and an extension of body portion 5.

A fish hook 17 is loosely mounted for pivotal movement on each side of stem 3 by means of a rivet 19 passing through the eye formed at the upper end of each fish hook and through the opening 21 formed in head 7. Each fish hook 17 is formed adjacent the upper end thereof with a bend 23, and the fish hooks 17 are disposed with the inner surface 25 directed toward stem 3. The lower end of each fish hook at the curved portion 27 is bent slightly laterally of the shank portion 29 to lie directly below the lower end 11 of stem 3 with the point 31 and the barb 33 of each fish hook lying in a nested, sheltered position. The curved portions 27 of fish hooks 17 are in side-by-side engagement with each other, and the point 31 and barb 33 of each fish hook is sheltered by the shank of the other fish hook, as best illustrated in FIG. 3.

Figure 4:
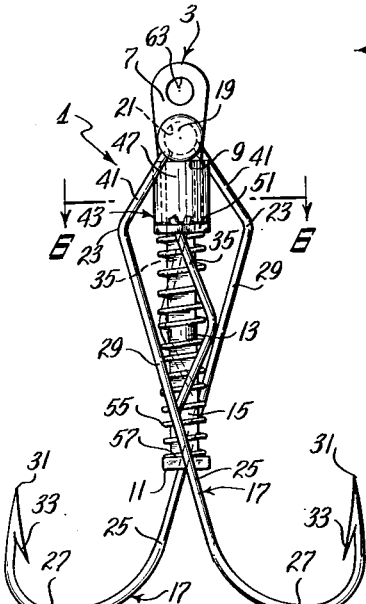
FIG. 4 is a side elevational view of the fish hook in actuated position with the points and barbs of the fish hooks exposed.
Figure 5:
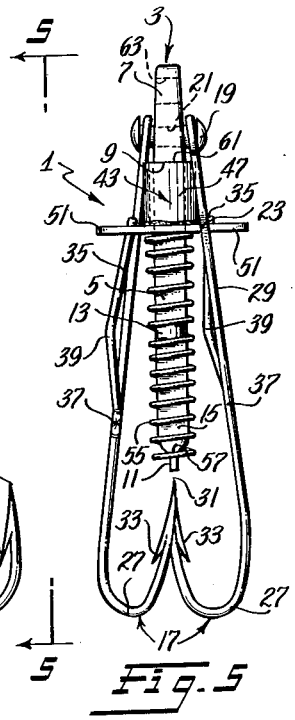
FIG. 5 is an end view of the fish hook in actuated position, taken on line 5—5 of FIG. 4, with the points and barbs thereof exposed.
Figure 2:
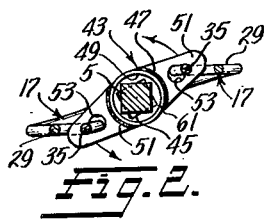
FIG. 2 is a sectional view of the fish hook taken on line 2—2 of FIG. 1.
Figure 6:
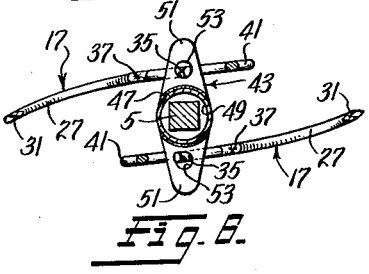
FIG. 6 is a sectional view of the fish hook taken on line 6—6 of FIG. 4.
Figure 3:
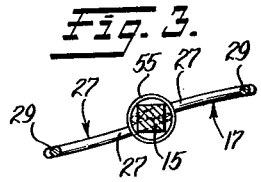
FIG. 3 is a sectional view of the fish hook taken on line 3—3 of FIG. 1.
Figure 8:
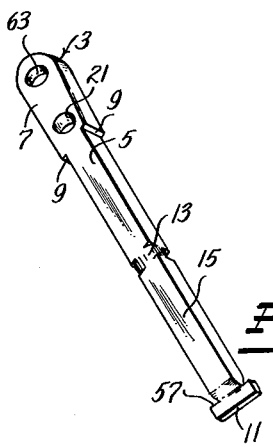
FIG. 8 is a perspective view of the stem of the fish hook illustrated in FIGS. 1, 2, 4, 5 and 6.
Figure 7:
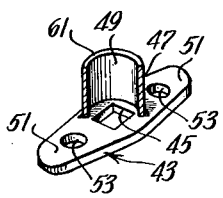
FIG. 7 is an enlarged perspective view, partially broken away, of the rider which is adapted to be mounted on the stem of the fish hook.

In order to cause the fish hooks 17 to be moved from the nested, sheltered position, illustrated in FIGS. 1–3 to the exposed position illustrated in FIGS. 4–6, actuating means operated by the bite of a fish thereon, is provided and includes an arm 35 rigidly attached, as by resistance weld 37, to the inner surface of the intermediate portion of shank 29 of each fish hook 17. With the fish hooks 17 disposed as illustrated in FIG. 1, each arm 35 extends inwardly from the inner surface 25 of the corresponding fish hook 17 toward stem 3, and is bent as at 39 to extend upwardly and slightly outwardly with respect to stem 3 to terminate adjacent to and directly below the upper inclined portion 41 of shank 29. Each arm 35 and the shank of the corresponding fish hook lie in substantially parallel planes which are disposed on opposite sides of the axis of body portion 5. The relation of arms 35 to fish hooks 17 and body portion 5, when the hooks are in nested, sheltered position, is best illustrated in FIG. 2 and it will be seen that a plane passing through the shank 29 of one of the fish hooks 17 and through the arm 35 attached thereto is laterally disposed with respect to the axis of body portion 5.

A rider 43, the base of which is preferably formed of flat sheet material slightly less in thickness than the length of circular portion 13, is mounted on body portions 5 and is adapted to move between an upper position where it contacts shoulders 9 and a lower position where it is adapted to be rotated on circular portion 13. A square opening 45, which is slightly larger than body portion 5, is formed in the central portion of rider 43 to slidably receive body portion 5 therein. In order to permit the rider 43 to slide on body portion 5 without tilting or bending, the rider includes a tubular guide 47 fixedly secured as by welding or soldering to the upper surface thereof, the opening 49 in tubular guide 47 being slightly greater in diameter than the diagonal distance across the corners of body portion 5 and being disposed with the axis of opening 49 coaxial with the axis of opening 45. Rider 43 extends outwardly on opposite sides from guide 47 to form a pair of flange portions 51. An opening 53, slightly larger in diameter than the diameter of arms 35 is formed in each flange 51 on opposite sides of opening 45. Rider 43 is slidably mounted on stem 3 with body portion 5 inserted through opening 45 and with arms 35 slidably disposed in openings 53 formed in flanges 51 on opposite sides of tubular guide 47. Rider 43 is urged to the upper position by means of a coiled compression spring 55, which is mounted on the lower portion 15 of stem 3. The lower end 11 of stem 3 is upset to form an abutment 57 against which the lower end of the spring 55 reacts while the upper end of the spring is seated in contact with the lower surface of rider 43.

It will be seen that rider 43 may slide on the body portion 5 of stem 3, but because of the square configuration of body 5 and opening 45, rider 43 is not permitted to rotate thereon. However, when rider 43 is moved to the lower position with opening 45 encircling circular portion 13, rider 43 may be rotated to the position illustrated in FIGS. 1 and 2, bringing square opening 45 therein out of registry with square body portion 5 and thus preventing upward movement of the rider 43 on body portion 5. The length of circular portion 13 is arranged to be greater than the thickness of rider 43 in order to permit rider 43 to rotate on stem 3.

The fish hook may be moved from the inoperative position shown in FIGS. 1, 2 and 3 with the fish hooks in nested, sheltered position to the actuated position with the fish hooks exposed, as illustrated in FIGS. 4, 5 and 6 by either an inward pressure exerted on the outer surfaces of shanks 29 or by pressure or force applied to the upper surface 59 of inclined portions 41. Pressure applied in either manner will move shanks 29 and arms 35 attached thereto inwardly toward stem 3, causing rider 43 to rotate on circular portion 13. Upon sufficient rotation of ride 43 to align the square opening 45 therein with square body portion 5, compression spring 55 will instantly force the rider 43 to slide up body portion 5 to the upper position wherein the upper end 61 of tubular guide 47 contacts shoulders 9. The initial rotation of rider 43 tends to separate and move the curved portion 27 of fish hooks 17 apart. The subsequent movement of rider 43 to the upper position, sliding along arms 35, tends to further separate the lower ends of the fish hooks and to move the fish hooks outwardly in opposite directions to the position illustrated in FIGS. 4, 5 and 6.

It has been determined that fish strike or bite on a fish hook or lure from nearly any direction and, therefore, the fish hook disclosed herein is so constructed as to be actuated by the strike or bite of a fish thereon from any direction. For example, a fish striking or biting on the present fish hook from either the lower end or the side thereof when the fish hook is in the inoperative position shown in FIGS. 1–3 will exert inward pressure on the outer surface of the shank portions 29 to actuate the device to the position shown in FIGS. 4–6. A fish striking or biting the fish hook from above or from the side adjacent head 7, will tend to slide toward the lower end of the fish hook to exert a pressure or force downwardly on the upper surface 59 of inclined shank portions 41 and actuate the fish hook from the inoperative to the operative position. In the event that a large fish might swallow the fish hook, the pressure exerted on the outer surface of shank portions 29 and on the upper surface 59 of inclined shank portions 41 by attempting to pull the fish hook away from the fish, will actuate the fish hook from inoperative to operative position.

In order to return the fish hooks to the nested, sheltered position illustrated in FIGS. 1–3, the rider 43 is forced to slide down body portion 5 to the lower position where opening 45 encircles circular portion 13 to compress spring 55 and is then rotated to the positions illustrated in FIG. 2 to bring square opening 45 out of alignment with square body portion 5 and thus maintain the rider in the lower position.

The weedless fish hook may be directly attached to a fish line or may be attached to artificial lures, baits, spoons, etc., by means of opening 63 formed adjacent the upper end of head 7. If desired, the fish hook may be adorned or camouflage by attaching feathers, hair or the like to the head portion and preferably between opening 63 and rivet 19. The head 7 and the spacing between rivet 19 and opening 63 may be varied in order to provide a suitable area for attaching any desired attractive material thereto. Fish hooks of the type disclosed herein may be made in a variety of sizes and it may be found desirable under certain circumstances to provide means for adjusting the compression of spring 55. In this event, the lower portion 15 of stem 3 may be threaded and a nut adjustably mounted thereon to bear against the lower end of spring 55.

As mentioned above, the body portion 5 of stem 3 may be of any non-circular configuration, as viewed in cross section in order to prevent rider 43 from rotating thereon while sliding between the upper and lower positions. The opening 45 in rider 43 may be of the same configuration as the cross-sectional configuration of body portion 5 or of some other configuration which will permit the rider to non-rotatably slide on body 5 and to rotate on circular portion 13 to a position where the opening in rider 43 is out of registry with the body portion 5 to prevent upward movement of rider 43 thereon.

While the preferred embodiment of the present invention is described and disclosed herein, such changes, modifications, alterations or equivalents as may occur to those skilled in the art, are intended to be encompassed by the present invention as defined in the appended claims.

I claim:
1. A weedless fish hook comprising:
 (a) an elongated stem;
 (b) a fish hook pivotally mounted on said stem adjacent the upper end thereof with the inner portion of the shank of said fish hook facing said stem;
 (c) a rider mounted on said stem for sliding movement between upper and lower positions thereon and including a laterally extending portion slidably engaging said fish hook to maintain said fish hook in sheltered position with the lower portion of said fish hook disposed below the lower end of said stem when said rider is in one of said positions and to move said fish hook outwardly from beneath said stem to an exposed position when said rider moves from said one position to the other of said positions;
 (d) means for securing said rider in said one position against sliding movements on said stem while permitting rotative movement thereof;
 (e) said means being responsive to rotative movement of said rider for releasing said rider from said one position; and
 (f) resilient means urging said rider toward said other position.

2. A weedless fish hook comprising:
 (a) an elongated stem;
 (b) a pair of fish hooks, said hooks being pivotally mounted adjacent the upper end of said stem on opposite sides thereof with the inner portion of the shanks of said fish hooks facing said stem;
 (c) a rider mounted on said stem for sliding, non-rotative movement between upper and lower positions thereon and including laterally extending portions slidably engaging said fish hooks to maintain said fish hooks in sheltered position with the lower portion of said fish hooks disposed below the lower end of said stem when said rider is in one of said positions and to move said fish hooks outwardly in opposite directions to an exposed position when moving from said one position to the other of said positions;

(d) means mounting said rider for rotative movement on said stem in said one position;

(e) means for securing said rider in said one position against sliding movement on said stem while permitting rotative movement thereof;

(f) said means being responsive to rotative movement of said rider for releasing said rider from said one position; and (g) resilient means urging said rider toward said other position.

3. A weedless fish hook comprising:

(a) an elongated stem;

(b) a pair of fish hooks, said hooks being pivotally mounted adjacent the upper end of said stem on opposite sides thereof with the inner portion of the shanks of said fish hooks facing said stem;

(c) a rider mounted on said stem for sliding movement between upper and lower positions thereon and including laterally extending portions slidably engaging said fish hooks to maintain said fish hooks in sheltered position with the lower portion of said fish hooks disposed below the lower end of said stem when said rider is in one of said positions and to move said fish hooks outwardly in opposite directions to an exposed position when moving from said one position to the other of said positions;

(d) means for securing said rider in said one position against sliding movement on said stem while permitting rotative movement thereof;

(e) said means being responsive to rotative movement of said rider for releasing said rider from said one position; and (f) resilient means urging said rider toward said other position.

4. A weedless fish hook comprising:

(a) an elongated stem;

(b) a pair of fish hooks, said hooks being pivotally mounted adjacent the upper end of said stem on opposite sides thereof with the inner portion of the shanks of said fish hooks facing said stem;

(c) a rider mounted on said stem for sliding movement between upper and lower positions thereon and including laterally extending portions slidably engaging said fish hooks to maintain said fish hooks in sheltered position with the lower portion of said fish hooks disposed below the lower end of said stem when said rider is in said lower position and to move said fish hooks outwardly in opposite directions to an exposed position when moving from said lower position to said upper position;

(d) means for securing said rider in said lower position against sliding movement on said stem while permitting rotative movement thereof;

(e) said means being responsive to rotative movement of said rider for releasing said rider from said lower position; and (f) resilient means urging said rider toward said upper position.

5. A weedless fish hook comprising:

(a) an elongated stem of non-circular cross-sectional configuration;

(b) a pair of fish hooks, said hooks being pivotally mounted adjacent the upper end of said stem on opposite sides thereof with the inner portion of the shanks of said fish hooks facing said stem;

(c) a rider provided with an opening therethrough of the same configuration as said cross-sectional configuration of said stem mounted on said stem for sliding movement between upper and lower positions thereon and including laterally extending portions slidably engaging said fish hooks to maintain said fish hooks in sheltered position with the lower portion of said fish hooks disposed below the lower end of said stem when said rider is in said lower position and to move said fish hooks outwardly in opposite directions to an exposed position when moving to said upper position;

(d) means mounting said rider for rotative movement on said stem at said lower position for movement from a first relationship with said stem in which said opening in said rider is out of registry with said stem configuration for securing said rider at said lower position to a second relationship with said stem effected by the strike of a fish in which said opening in said rider and said stem configuration are in registry for releasing said rider from said lower position; and (e) resilient means urging said rider toward said upper position.

6. A weedless fish hook comprising:

(a) an elongated stem;

(b) a pair of fish hooks, said hooks being pivotally mounted adjacent the upper end of said stem on opposite sides thereof with the inner portion of shanks of said fish hooks facing said stem;

(c) an actuating arm formed on the shank of each of said fish hooks, said arms lying in parallel planes on opposite sides of said stem;

(d) a rider mounted on said stem for sliding movement between upper and lower positions thereon and including laterally extending portions slidably engaging said arms between corresponding upper and lower positions thereon;

(e) said arms diverging with respect to said stem at least from one of said positions to the other of said positions to maintain said fish hooks in sheltered position with the lower portion of said fish hooks disposed below the lower end of said stem when said rider is in said one position, and to move said fish hooks outwardly in opposite directions to an exposed position when moving from said one position to the other of said positions;

(f) means for securing said rider in said one position against sliding movement on said stem while permitting relative rotative movement thereof;

(g) said means being responsive to rotative movement of said rider for releasing said rider from said one position; and (h) resilient means urging said rider toward said other position.

7. A weedless fish hook comprising:

(a) an elongated stem of non-circular cross-sectional configuration;

(b) a pair of fish hooks, said hooks being pivotally mounted adjacent the upper end of said stem on opposite sides thereof with the inner portion of the shanks of said fish hooks facing said stem;

(c) an actuating arm rigidly attached at the lower end thereof to the shank of each of said fish hooks intermediate the ends thereof;

(d) each of said arms extending generally upwardly from said lower end thereof toward said pivotal mounting of said hooks and with the free ends thereof diverging outwardly with respect to said stem;

(e) a rider, provided with an opening therethrough of the same configuration as said cross-sectional configuration of said stem, mounted on said stem for sliding movement between upper and lower position thereon and including laterally extending portions slidably engaging said arms to maintain said fish hooks in sheltered position with the lower portion of said fish hooks disposed below the lower end of said stem when said rider is in said lower position, and to move said fish hooks outwardly in opposite directions to an exposed position when moved to said upper position;

(f) means mounting said rider for rotative movement on said stem at said lower position for movement from a first relationship with said stem in which said opening in said rider is out of registry with said stem configuration for securing said rider at said lower position to a second relationship with said stem effected by the strike of a fish in which said opening in said rider and said stem configuration are in registry for releasing said rider from said lower position; and (g) resilient means urging said rider toward said upper position.

8. A weedless fish hook comprising:

(a) an elongated stem of square, cross-sectional configuration;

(b) an enlarged head formed at the upper end of said stem having an opening therethrough;

(c) a rivet extending through said opening in said head;

(d) a pair of fish hooks, said hooks being pivotally mounted at the upper end thereof on opposite ends of said rivet on each side of said head with the inner portion of the shank of said hooks facing toward said stem;

(e) the upper end of the shank of each hook first being inclined outwardly and downwardly from said rivet away from said stem and then extending downwardly substantially parallel to said stem when in inoperative position;

(f) an actuating arm rigidly attached at the lower end thereof to the inner surface of the shank of each of said hooks midway between the ends thereof, said arm extending inwardly at the lower end thereof from said shank toward said stem and then upwardly and away from said stem to a point adjacent to and below said inclined shank portion;

(g) each of said arms and the shank of the corresponding fish hook lying in substantially parallel planes disposed on opposite sides of the axis of said stem;

(h) a rider having a square opening therethrough mounted on said stem for sliding movement between upper and lower positions thereon;

(i) said rider including a laterally extending flange portion formed with an opening therein on opposite sides thereof slidably receiving said respective actuating arm therein;

(j) said rider and said actuating arms cooperating to move said fish hooks to nested, sheltered position with the lower curved portion of said fish hooks including the barbs and points thereof disposed in crossed, nested position below the lower end of said stem when said rider is moved to said lower position, and to move said fish hooks outwardly in opposite directions to an exposed position when said rider is moved to said upper position;

(k) said stem being formed with a portion of reduced diameter at the lower position of said rider;

(l) said rider being rotatable on said reduced portion of said stem by force applied to the outer surface of the shanks of said hooks or to the upper surface of said inclined portions for movement from a first relationship wherein the square opening therein is out of registry with said square stem for securing said rider in said lower position to a second relationship wherein said opening is in registry with said stem for releasing said rider from said lower position;

(m) a coiled compression spring surrounding the lower end of said stem below said rider; and (n) means on the lower end of said stem forming an abutment for the lower end of said spring;

(o) the upper end of said spring bearing against said rider, urging said rider to said upper position.

References Cited in the file of this patent

UNITED STATES PATENTS

| | | |
|---|---|---|
| 2,485,946 | Watt | Oct. 25, 1949 |
| 2,602,689 | Matz | July 8, 1952 |
| 2,759,289 | Haape | Aug. 21, 1956 |
| 2,982,046 | Wilson | May 2, 1961 |